United States Patent [19]
Slaughter

[11] 3,793,771
[45] Feb. 26, 1974

[54] FOLDABLE PLANT SUPPORT

[75] Inventor: Delia L. Slaughter, Greensboro, Ga.

[73] Assignee: The Raymond Lee Organization, Inc., New York, N.Y.; a part interest

[22] Filed: Mar. 15, 1973

[21] Appl. No.: 341,371

[52] U.S. Cl............................ 47/44, 47/26, 47/47
[51] Int. Cl..................... A01g 17/14, A01g 17/06
[58] Field of Search.............. 47/44–47, 26–31, 47/43, 42

[56] References Cited
UNITED STATES PATENTS
1,754,534  4/1930  Vought .............................. 47/47
FOREIGN PATENTS OR APPLICATIONS
566,264  12/1944  Great Britain ......................... 47/47
747,429  4/1956  Great Britain ......................... 47/29
814,071  9/1951  Germany ................................ 47/44
12,744  6/1903  Great Britain ......................... 47/44

Primary Examiner—Robert E. Pulfrey
Assistant Examiner—Steven A. Bratlie

[57] ABSTRACT

A plant support comprising first and second vertical parallel members, each member defining an inverted U with the bottom ends of the vertical legs being pointed; hinge means secured to and extending between the members to either hold the members in extended position or to enable the members to be folded together side by side; and a vertical section of mesh secured to the front face of each of the members.

1 Claim, 3 Drawing Figures

PATENTED FEB 26 1974 3,793,771

FOLDABLE PLANT SUPPORT

SUMMARY OF THE INVENTION

My invention is directed toward a new type of plant support particularly adapted to growing tomatoes in small garden plots. The support is inexpensive, easily used, and can be easily erected or stored in compact folded position when not in use. The support is durable and light in weight and can be used and reused for many years.

To this end, I employ first and second parallel vertical members defining inverted U's and having vertical legs with downwardly pointed ends for easy insertion into the ground. Manually operable hinge means secured to and extending between the members either support the members in vertically spaced position for use or enable the members to be folded one upon the other for storage.

Sections of vertical mesh are secured to the front face of each member. Vertically spaced horizontal bars are secured to the front face of each member and hold the mesh in position. Lengths of cord are secured at upper ends in spaced positions to the bars and hang downwards. The infant tomato plants are disposed in the ground adjacent the members. As the plants grow they are tied in place by the cords and grow along the mesh. Tomatoes can be easily harvested.

DETAILED DESCRIPTION OF PREFERRED EMBODIMENTS

Figures 1, 2, 3:
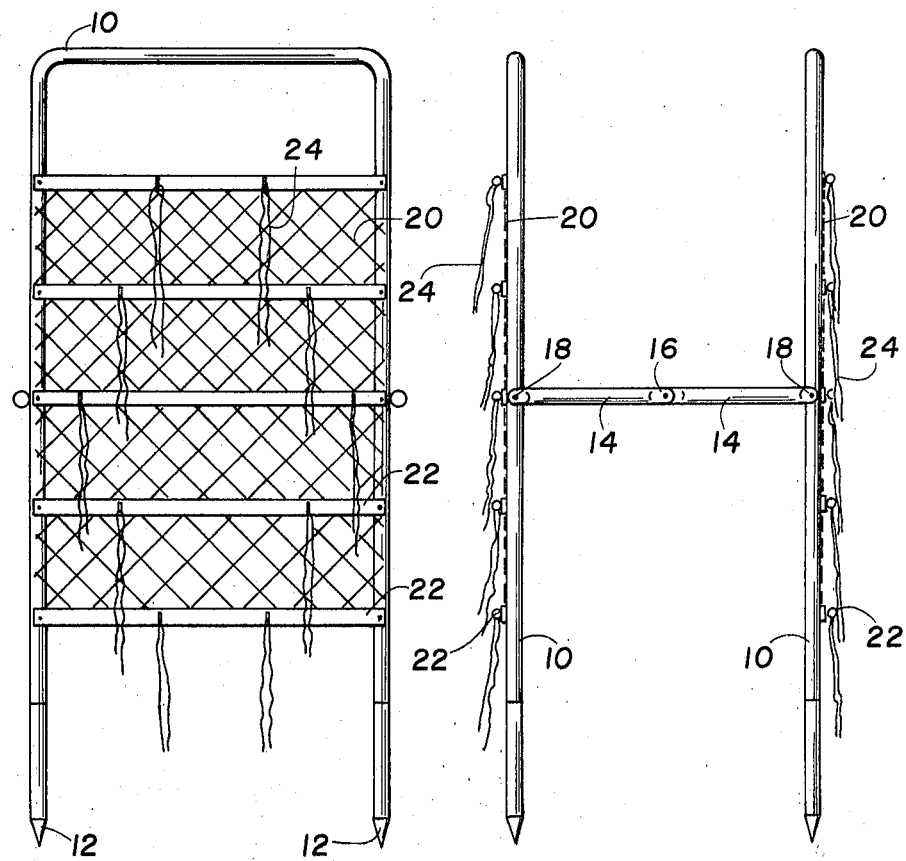
FIG. 1 is a perspective view of my invention in use.
FIG. 2 is a front view thereof.
FIG. 3 is a side view thereof.

Referring now to FIGS. 1–3, first and second vertical spaced parallel members 10 each define a vertical inverted U with vertical legs having downwardly pointed ends 12. The members can be formed from hollow aluminum tubing.

Flat straps 14 are disposed in pairs and extend between corresponding legs of the two members. The straps in each pair are pivotally secured together at abutting ends as shown at 16, with the free end of each strap being pivotally secured to a corresponding leg as shown at 18. When the straps in each pair are extended to define a horizontal line, the members are extended and can be inserted into the soil for use. The straps can be folded up whereby the two members can be folded together in side by side position.

A vertical section of chicken wire or other mesh 20 is placed over the front face of each member, being spaced from the upper and lower ends. A plurality of horizontal bars 22, vertically spaced extend in front of the mesh and are secured at each end to a corresponding leg to hold the mesh in position.

The straps and bars can also be formed from aluminum tubing.

Each bar has two spaced lengths or cord 24 or the like secured at upper ends to the bar and hanging downward. The lengths of cord are staggered from bar to bar so that the cords on any two adjacent bars do not vertically overlap.

With the invention in use, plants 26 can be tied in position as they grow whereby tomatoes can be grown readily as desired.

While I have described my invention with particular reference to the drawings, such is not to be considered as limiting its actual scope.

I claim:

1. A plant support comprising:

first and second parallel vertical members, each defining an inverted U with the bottom ends of the vertical legs being pointed to facilitate insertion into the ground, said members having inner adjacent surfaces and remote outer surfaces;

first and second vertical rectangular sheets of mesh, each sheet being secured to the outer surface of a corresponding member and spaced from top and bottom portions thereof;

hinge means secured to and extending between the members, the means having an extended position at which the members are disposed for use in relative extended position and having a folded position at which the members are folded together in side by side position;

a plurality of horizontal bars, half of said plurality of bars being associated with each member in such manner that said half plurality are secured to the legs of the member and extend therebetween in vertically spaced horizontal positions, the mesh of the member being disposed between the member and the bars; and a plurality of lengths of cord secured to each bar and hanging downward therefrom.

* * * * *